United States Patent
Fang et al.

(10) Patent No.: US 11,088,818 B1
(45) Date of Patent: Aug. 10, 2021

(54) RECEIVER AND TRANSMITTER FOR HIGH SPEED DATA AND LOW SPEED COMMAND SIGNAL TRANSMISSIONS

(71) Applicant: NOVATEK Microelectronics Corp., Hsin-Chu (TW)

(72) Inventors: Yong-Ren Fang, Kaohsiung (TW); Yu-Hsiang Wang, Hsinchu (TW); Che-Wei Yeh, Hsinchu (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 16/919,049

(22) Filed: Jul. 1, 2020

(51) Int. Cl.
*H04L 7/04* (2006.01)
*H04L 7/027* (2006.01)

(52) U.S. Cl.
CPC .................... *H04L 7/027* (2013.01)

(58) Field of Classification Search
CPC .... H04L 7/027; H04L 25/4904; H04L 7/0079
USPC ................. 375/316, 357, 362, 361
See application file for complete search history.

(56) References Cited

U.S. PATENT DOCUMENTS 7,675,444 B1 * 3/2010 Smith ................. H04L 25/4904
341/141

* cited by examiner

*Primary Examiner* — Phuong Phu
(74) *Attorney, Agent, or Firm* — Winston Hsu (57) ABSTRACT

A receiver is configured to receive a series of command signals and a series of data signals. The receiver includes a first clock and data recovery (CDR) circuit, a control circuit and a second CDR circuit. The first CDR circuit is configured to process the series of command signal to generate a clock signal. The control circuit, coupled to the first CDR circuit, is configured to generate a control signal according to the series of command signals and the clock signal received from the first CDR circuit. The second CDR circuit, coupled to the control circuit, is configured to process the series of data signals according to the control signal received from the control circuit.

12 Claims, 8 Drawing Sheets

RECEIVER AND TRANSMITTER FOR HIGH SPEED DATA AND LOW SPEED COMMAND SIGNAL TRANSMISSIONS

BACKGROUND OF THE INVENTION

1. Field of the Invention

The present invention relates to a signal transmission system, and more particularly, to a signal transmission system having a receiver and a transmitter capable of high speed data and low speed command signal transmissions.

2. Description of the Prior Art

In the conventional signal transmission system on a circuit board, after power-on, the master device should send command signals to control the slave device to start its operation, and then data signals can be forwarded between the master device and the slave device.

There are several signal transmission methods commonly used in the signal transmission system. In an example, the command signals may be transmitted with the same signal rate as high speed data to realize a high speed serial transmission. However, before the command signals are correctly received, the receiver may not be set up to receive the high speed command signals normally. In another example, the command signals may be transmitted independently, which is accompanied by a disadvantage of increasing path counts and hardware implementations. Alternatively, the slave device may be given with a fixed setting, which has a disadvantage that the setting cannot be configured or adjusted flexibly under different situations.

Thus, there is a need to provide a novel signal transmission system capable of transmitting the low speed command signals and high speed data signals.

SUMMARY OF THE INVENTION

It is therefore an objective of the present invention to provide a signal transmission system having a receiver and a transmitter capable of high speed data and low speed command signal transmissions.

An embodiment of the present invention discloses a receiver configured to receive a series of command signals and a series of data signals. The receiver comprises a first clock and data recovery (CDR) circuit, a control circuit and a second CDR circuit. The first CDR circuit is configured to process the series of command signal to generate a clock signal. The control circuit, coupled to the first CDR circuit, is configured to generate a control signal according to the series of command signals and the clock signal received from the first CDR circuit. The second CDR circuit, coupled to the control circuit, is configured to process the series of data signals according to the control signal received from the control circuit.

Another embodiment of the present invention discloses a transmitter configured to transmit a series of command signals and a series of data signals. The transmitter comprises a serializer and a multiplexer. The serializer is configured to generate the series of data signals. The multiplexer, coupled to the serializer, is configured to selectively output the series of command signals or the series of data signals.

Another embodiment of the present invention discloses a receiver configured to be coupled to a transmitter through a plurality of channels and configured to receive a series of command signals and a series of data signals from the transmitter. The receiver comprises a control circuit and a first CDR circuit. The control circuit is configured to receive the series of command signals through a first channel among the plurality of channels and receive a clock signal through a second channel among the plurality of channels, and generate a first control signal according to the series of command signals and the clock signal. The first CDR circuit, coupled to the control circuit, is configured to process the series of data signals according to the first control signal received from the control circuit.

Another embodiment of the present invention discloses a transmitter configured to be coupled to a receiver through a plurality of channels and configured to transmit a series of command signals and a series of data signals to the receiver. The transmitter comprises a serializer and a first multiplexer. The serializer is configured to generate the series of data signals. The first multiplexer, coupled to the serializer, is configured to selectively forward the series of command signals or the series of data signals to a first channel among the plurality of channels. Wherein, a clock signal corresponding to the series of command signals is transmitted through a second channel among the plurality of channels.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
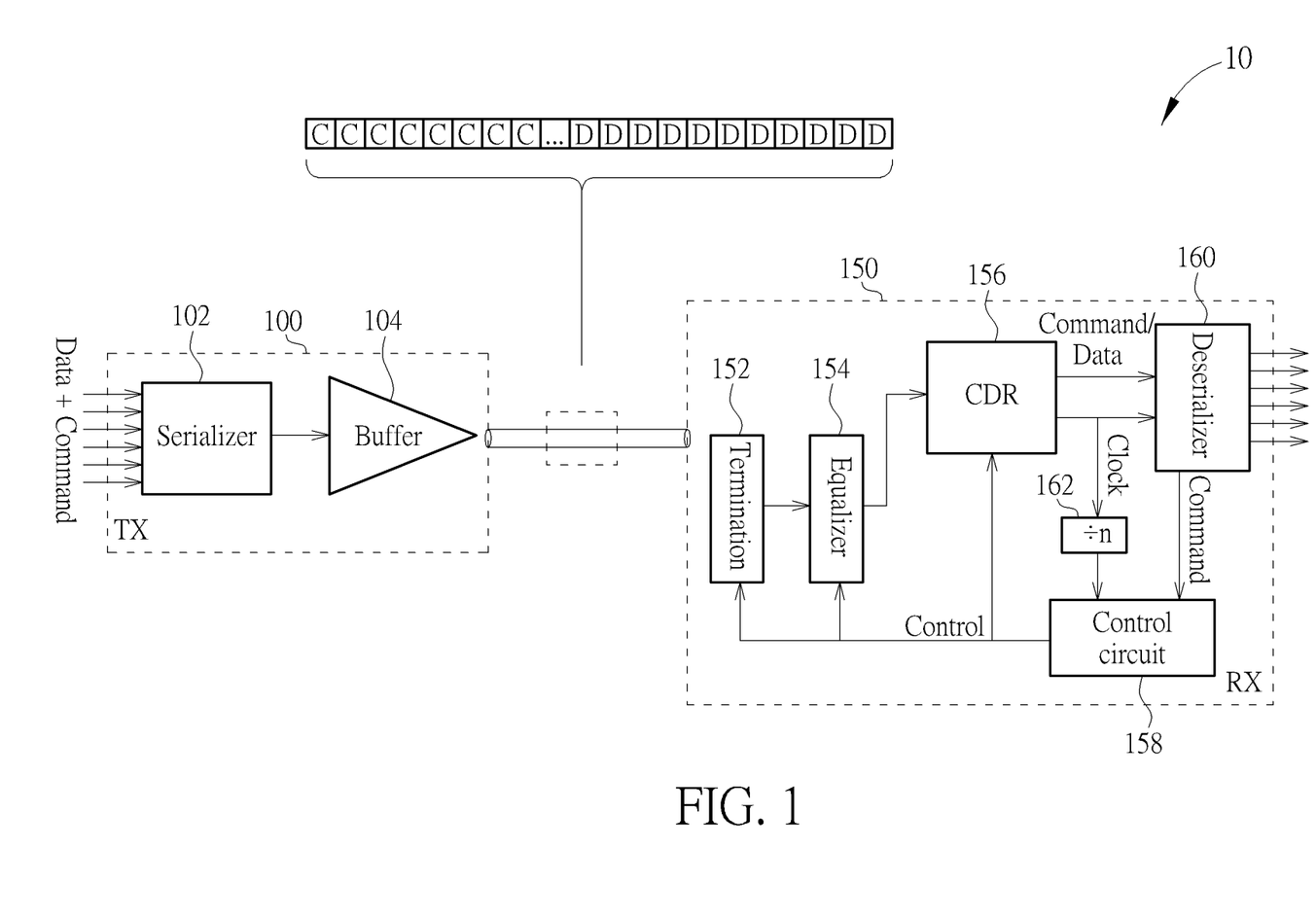
FIGS. 1-3 are schematic diagrams of a signal transmission system.

Please refer to FIG. 1, which is a schematic diagram of a signal transmission system 10. As shown in FIG. 1, the signal transmission system 10 includes a transmitter (TX) 100 and a receiver (RX) 150. The transmitter 100, which may be a master device such as a system processor on the circuit board, includes a serializer 102 and an output buffer 104. A series of command signals and a series of data signals may come from a digital circuit in the system processor, to be forwarded by the transmitter 100. The serializer 102 is configured to perform parallel to serial conversion on the command signals and the data signals, to generate the command signals and the data signals in series. The output buffer 104 is configured to output the command signals and the data signals to the receiver 150.

The receiver 150, which may be a slave device such as a functional integrated circuit (IC) on the circuit board, includes a termination circuit 152, an equalizer 154, a clock and data recovery (CDR) circuit 156, a control circuit 158, a deserializer 160 and a frequency divider 162. The termination circuit 152, which is usually implemented in a high speed transmission system for impedance matching, may include a termination resistor or any other similar circuit element capable of generating impedance. The equalizer 154 is configured to compensate possible signal losses generated on the channel. The CDR circuit 156 is configured to extract the clock signal embedded in the received command signals and data signals. The clock signal may then be divided through the frequency divider 162, to generate another clock signal having lower frequency for the control circuit 158. The control circuit 158, which may be a digital circuit implemented in the IC, is configured to control various operations of the circuit blocks of the receiver 150. The deserializer 160 is configured to perform serial to parallel conversion on the data signals, and thereby output the data signals to follow-up circuitry in parallel.

As shown in FIG. 1, the transmitter 100 may transmit the series of command signals (denoted as C) and the series of data signals (denoted as D) to the receiver 150. It is necessary that the command signals are transmitted and received prior to the data signals. The command signals are used to initialize or set up the circuit blocks of the receiver 150 such as the termination circuit 152, the equalizer 154 and the CDR circuit 156. Therefore, after the command signals are successfully received and processed, the circuit blocks of the receiver 150 are ready to receive and process the high speed data signals. In this example, the command signals and the data signals are both transmitted in high speed in the same channel. However, the circuit blocks of the receiver 150 should be initialized or set up according to the command signals. These circuit blocks may not be able to successfully receive and process the command signals in high speed if the initialization is not completed yet.

Figure 2:
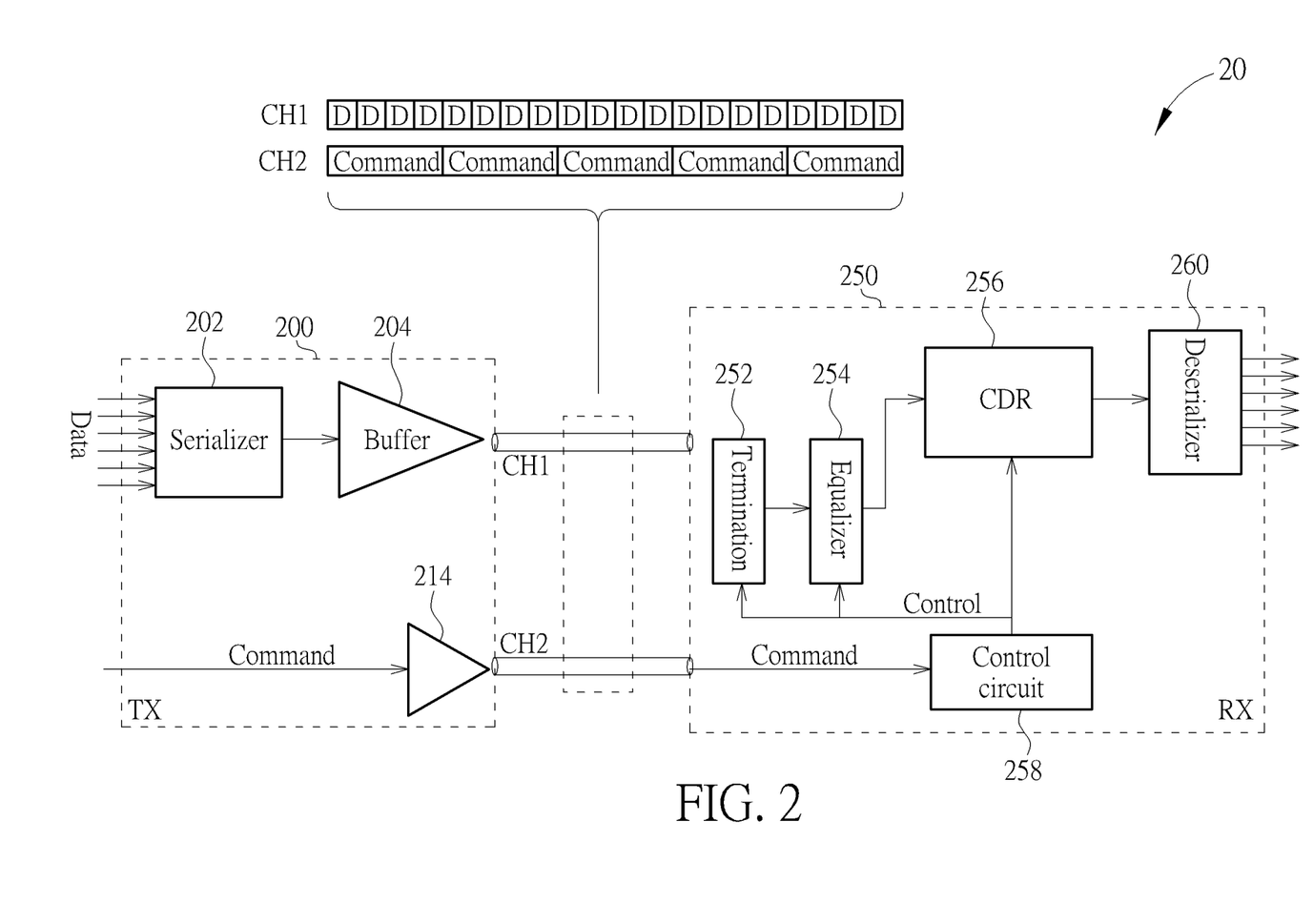

Please refer to FIG. 2, which is a schematic diagram of a signal transmission system 20. As shown in FIG. 2, the signal transmission system 20 includes a transmitter 200 and a receiver 250. The transmitter 200 includes a serializer 202 and an output buffer 204, which operate similarly as the serializer 102 and the output buffer 104, respectively, as shown in FIG. 1, and thus will not be detailed herein. The receiver 250 includes a termination circuit 252, an equalizer 254, a CDR circuit 256, a control circuit 258 and a deserializer 260, which operate similarly as the termination circuit 152, the equalizer 154, the CDR circuit 156, the control circuit 158 and the deserializer 160, respectively, as shown in FIG. 1, and thus will not be detailed herein.

In the signal transmission system 20, the data signals are transmitted through a main channel CH1, while the command signals are transmitted through a command channel CH2 other than the main channel CH1. The command signals may be forwarded in low speed, allowing the control circuit 258 to receive and process the command signals successfully. In this example, the transmitter 200 further includes another output buffer 214, which is configured to output the command signals to the channel CH2. Since the command signals are transmitted in low speed, they may be directly forwarded to the control circuit 258 without processing of the termination circuit 252, the equalizer 254 and the CDR circuit 256. In the signal transmission system 20, the command signals and the data signals are transmitted through different channels, and the command signals may be transmitted in low speed, which solves the problem that the high speed command signals cannot be successfully received or processed in the signal transmission system 10. However, the signal transmission system 20 requires another channel, which is accompanied by additional costs and signal skew problems.

Figure 3:
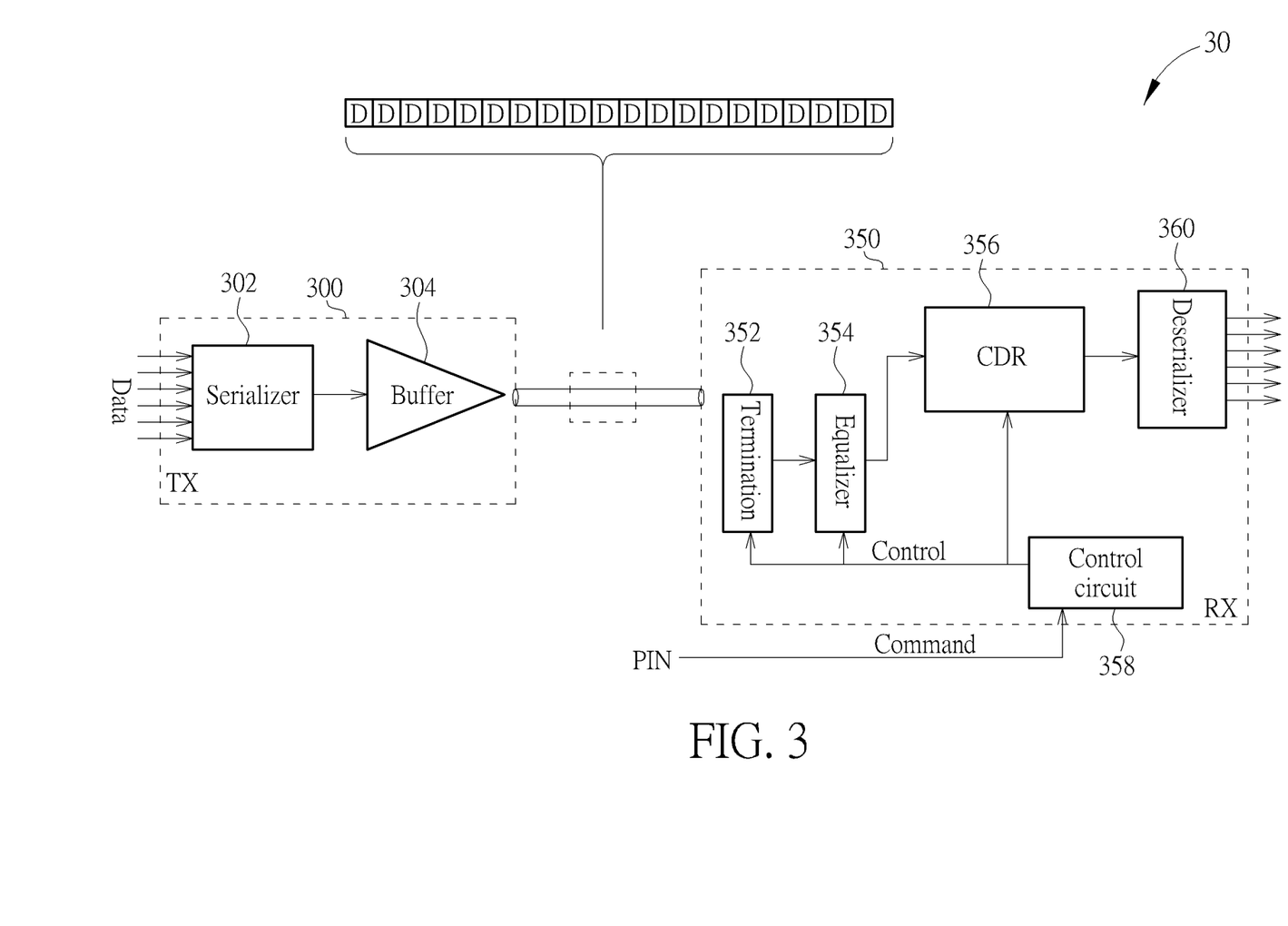

Please refer to FIG. 3, which is a schematic diagram of a signal transmission system 30. As shown in FIG. 3, the signal transmission system 30 includes a transmitter 300 and a receiver 350. The transmitter 300 includes a serializer 302 and an output buffer 304, which operate similarly as the serializer 102 and the output buffer 104, respectively, as shown in FIG. 1, and thus will not be detailed herein. The receiver 350 includes a termination circuit 352, an equalizer 354, a CDR circuit 356, a control circuit 358 and a deserializer 360, which operate similarly as the termination circuit 152, the equalizer 154, the CDR circuit 156, the control circuit 158 and the deserializer 160, respectively, as shown in FIG. 1, and thus will not be detailed herein.

In the example shown in FIG. 3, the command signals may be sent to the control circuit 358 through an input pin. This input pin is different from the terminal that receives the data signals; hence, more pin count is required, which results in higher circuit costs.

Figure 4:
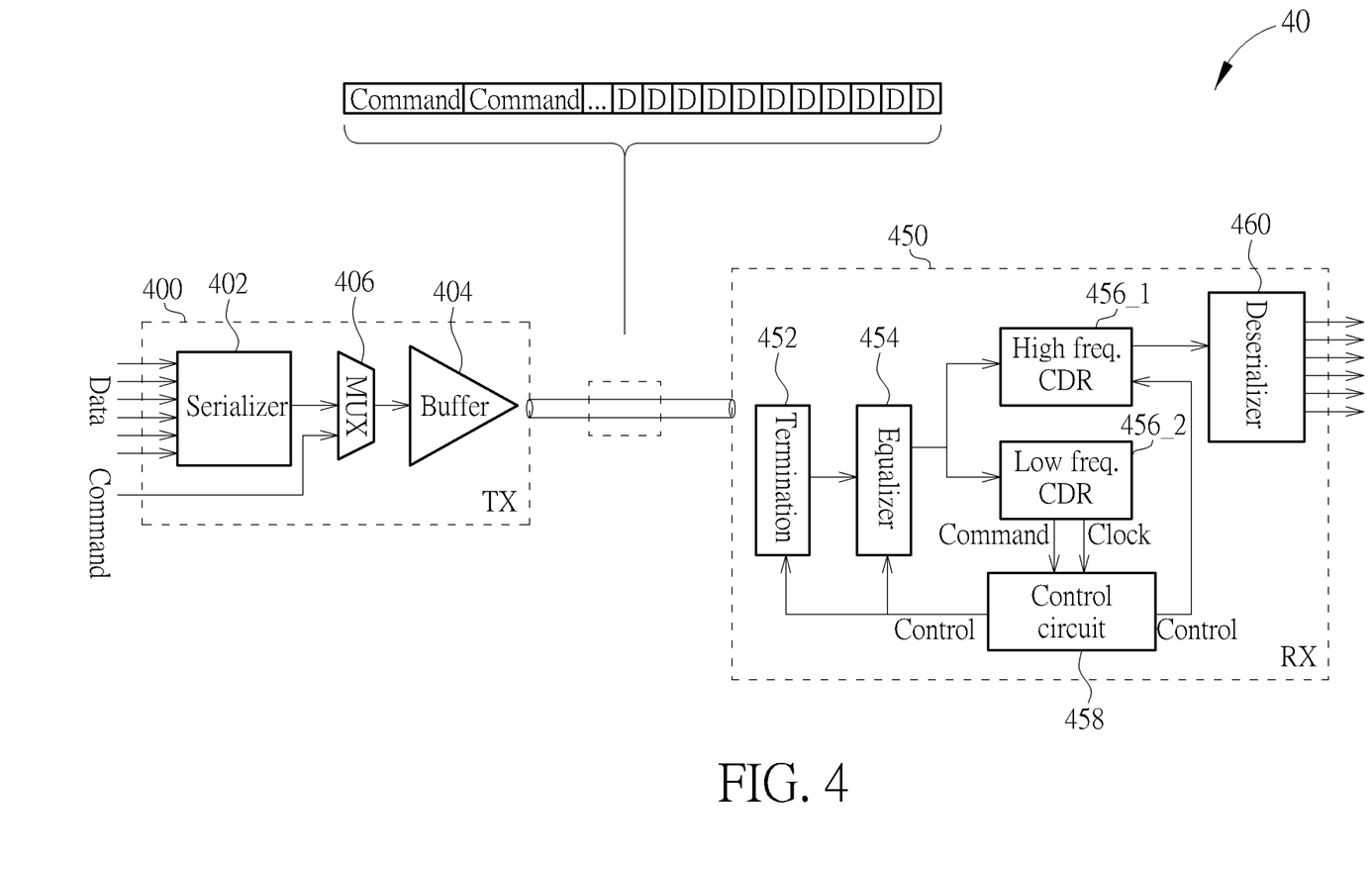
FIGS. 4-5 are schematic diagrams of a signal transmission system according to an embodiment of the present invention.

Please refer to FIG. 4, which is a schematic diagram of a signal transmission system 40 according to an embodiment of the present invention. As shown in FIG. 4, the signal transmission system 40 includes a transmitter 400 and a receiver 450. The transmitter 400 includes a serializer 402 and an output buffer 404, which operate similarly as the serializer 102 and the output buffer 104, respectively, as shown in FIG. 1, and thus will not be detailed herein. The receiver 450 includes a termination circuit 452, an equalizer 454, a control circuit 458 and a deserializer 460, which operate similarly as the termination circuit 152, the equalizer 154, the control circuit 158 and the deserializer 160, respectively, as shown in FIG. 1, and thus will not be detailed herein.

In this embodiment, the low speed command signals and the high speed data signals are transmitted through the same channel, and the command signals are transmitted and received prior to the data signals, allowing the circuit blocks in the receiver 450 to be initialized by the command signals and ready to receive the high speed data signals after successful initialization. Also, the signal transmission system 40 requires no additional pin or channel, and the signal skew problem is avoided in the signal transmission system 40.

The transmitter 400 further includes a multiplexer (MUX) 406 coupled between the serializer 402 and the output buffer 404. The MUX 406 is configured to selectively forward the command signals or the data signals to the output buffer 404. In this embodiment, the data signals and the command signals are forwarded to the transmitter 400 through different input terminals. More specifically, the data signals are serialized by the serializer 402, and the command signals are directly sent to the MUX 406. The data signals and the command signals are gathered to be outputted to the same channel in series with the control of the MUX 406.

In order to process both the low speed command signals and the high speed data signals, the receiver 450 includes a high frequency CDR circuit 456_1 and a low frequency CDR circuit 456_2. The high frequency CDR circuit 456_1 is configured to process the high speed data signals, and the low frequency CDR circuit 456_2 is configured to process the low speed command signals. Since the command signals are received prior to the data signals, the low frequency CDR circuit 456_2 may start to process the command signals before the data signals are received. The low frequency CDR circuit 456_2 may generate a clock signal based on the received command signals, and output the clock signal and the command signals to the control circuit 458. The control circuit 458 thereby sends control signals to the termination circuit 452, the equalizer 454 and/or the high frequency CDR circuit 456_1 to initialize or set up these circuit blocks. Therefore, these circuit blocks are ready to receive and process the high speed data signals according to the received control signals.

In this embodiment, the series of command signals are low speed command signals, and the series of data signals are high speed data signals. The command signals and the data signals may be transmitted with any frequency or signal rate. As long as the data rate of the data signals is greater than the signal rate of the command signals, the transmission scheme and related transmitter and receiver are belong to the scope of the present invention.

Please note that the receiver 450 shown in FIG. 4 requires two CDR circuits for processing signals in different frequencies, resulting in increasing hardware costs. In an embodiment, a wide-range CDR circuit may be implemented to replace the high frequency CDR circuit 456_1 and the low frequency CDR circuit 456_2. The wide-range CDR circuit may process signals of a large frequency range. In general, the data rate of the data signals may be greater than the signal rate of the command signals by multiple times. With large frequency difference therebetween, the complexity and difficulty of implementing the CDR circuit will increase significantly.

In order to simplify the design of CDR circuits and reduce the circuit costs of the receiver, in an embodiment, the command signals may be transmitted based on a Manchester-like encoding scheme. The Manchester-like encoding scheme includes, but is not limited to, the G. E. Thomas Manchester encoding, IEEE 802.3 Manchester encoding and differential Manchester encoding. For the sake of simplicity, the Manchester-like encoding will be called Manchester encoding hereinafter. If the command signals are processed with the Manchester encoding, the low frequency CDR circuit 456_2 may be implemented with a Manchester decoder, which may be much simpler and cheaper than a general CDR circuit.

Figure 5:
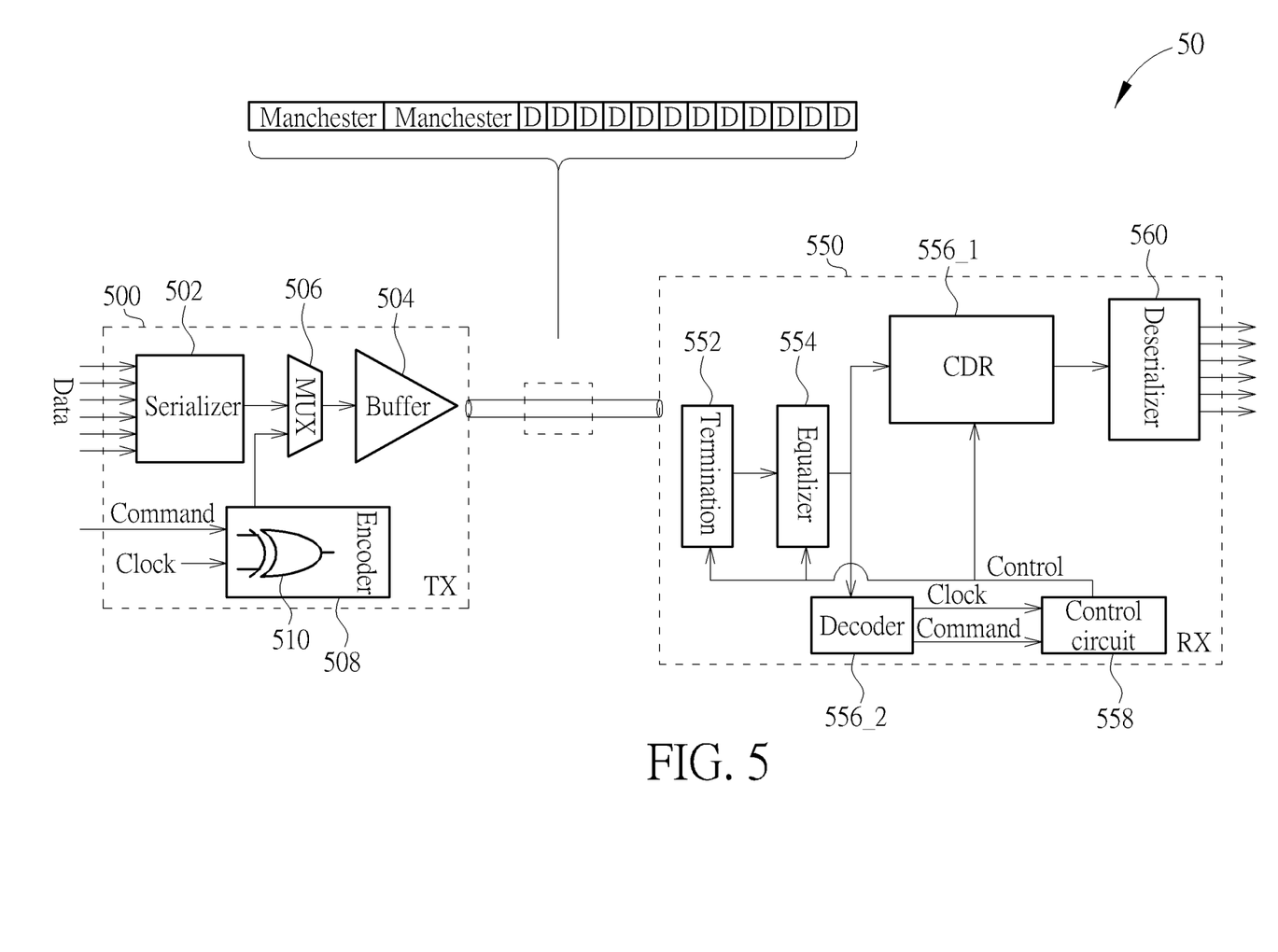

Please refer to FIG. 5, which is a schematic diagram of a signal transmission system 50 according to an embodiment of the present invention. As shown in FIG. 5, the signal transmission system 50 includes a transmitter 500 and a receiver 550. The transmitter 500 includes a serializer 502, an output buffer 504 and a MUX 506, which operate similarly as the serializer 402, the output buffer 404 and the MUX 406, respectively, as shown in FIG. 4, and thus will not be detailed herein. The receiver 550 includes a termination circuit 552, an equalizer 554, a CDR circuit 556_1, a control circuit 558 and a deserializer 560, which operate similarly as the termination circuit 452, the equalizer 454, the high frequency CDR circuit 456_1, the control circuit 458 and the deserializer 460, respectively, as shown in FIG. 4, and thus will not be detailed herein.

The transmitter 500 may further include a Manchester encoder 508. The Manchester encoder 508 may be coupled to the MUX 506 and configured to encode the command signals according to Manchester encoding method. The Manchester encoding allows the command signals transmitted to the receiver 550 to carry the clock information; correspondingly, the clock signal may be extracted in the receiver 550 without the usage of complex CDR circuit and additional clock pin, leading to reduction of circuit areas and power consumptions in the receiver 550. In another embodiment, the Manchester encoder 508 and the MUX 506 may be included in or integrated with the serializer 502.

In detail, the Manchester encoder 508 may include a first input terminal configured to receive the command signals, a second input terminal configured to receive the clock signal, and an output terminal. The clock signal may be configured to have the same frequency as the command signals, allowing the Manchester encoding to be feasible. After the command signals are encoded with the clock signal, the command signals may be outputted through the output terminal. In an embodiment, the Manchester encoder 508 may include an exclusive-OR (XOR) gate 510, as shown in FIG. 5. The XOR gate 510 may perform XOR operation on the original command signals and the clock signal, to generate the encoded command signals.

Figure 6:
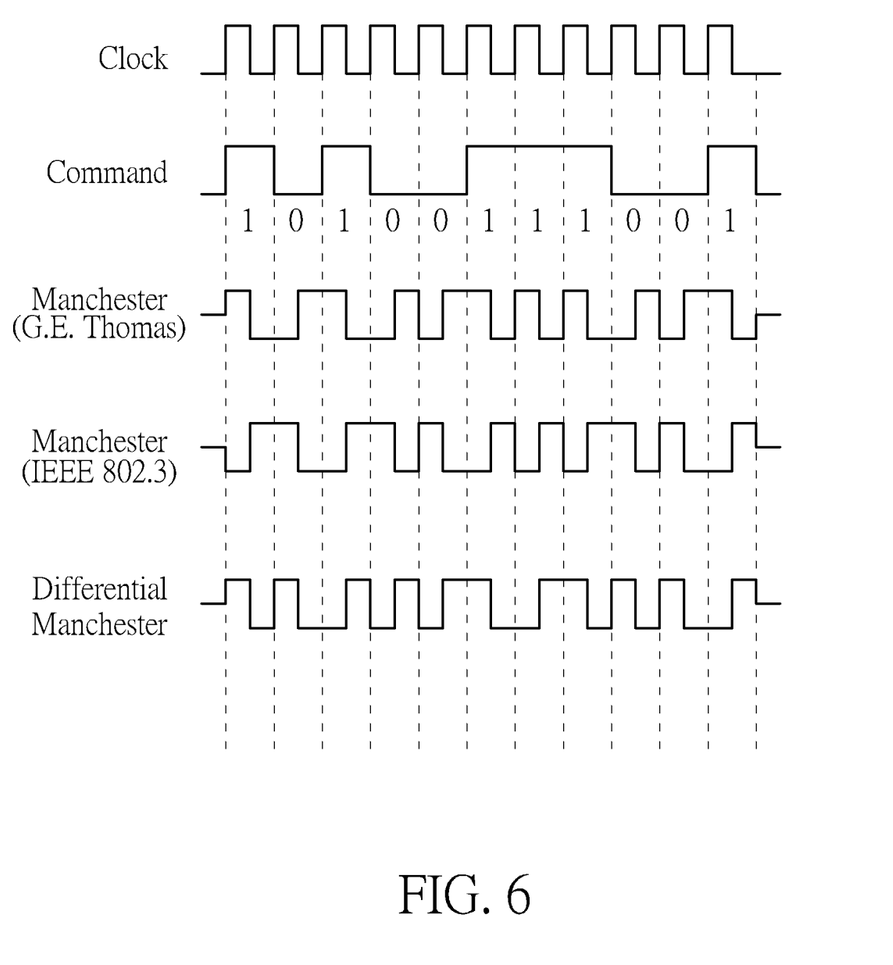
FIG. 6 illustrates several exemplary Manchester encoding methods applicable to the signal transmission system.

FIG. 6 illustrates several exemplary Manchester encoding methods applicable to the signal transmission system 50. As shown in FIG. 6, the feasible Manchester encoding method may include the G. E. Thomas Manchester encoding, IEEE 802.3 Manchester encoding and differential Manchester encoding. According to the G. E. Thomas Manchester encoding, the rising edge of the clock signal is aligned with the transition time point of the command signals, and the XOR operation is performed on the clock signal and the command signals to generate the Manchester codes. According to the IEEE 802.3 Manchester encoding, the rising edge of the clock signal is aligned with the transition time point of the command signals, and the XOR operation is performed on the clock signal and the command signals and then the XOR result is inverted to generate the Manchester codes. According to the differential Manchester encoding, the output Manchester codes include two states: high-to-low and low-to-high, based on the received command signals. If the command signal is "1", the state changes; if the command signal is "0", the state remains unchanged.

Please refer back to FIG. 5. According to the applied Manchester encoding method, the receiver 550 may further include a Manchester decoder 556_2. The Manchester decoder 556_2 may receive the encoded command signals and then perform decoding on the encoded command signals to recover the original command signals and extract the clock signal. Therefore, the original command signals and the clock signal may be provided for the control circuit 558, allowing the control circuit 558 to control the circuit blocks in the receiver 550 to be initialized.

Based on the feature of the Manchester encoding, the original command signals and the clock signal in the same frequency may be recovered by the Manchester decoder 556_2 without receiving additional clock signals or trigger signals. The Manchester decoder 556_2 may only require a simple circuit structure, which may include, but is not limited to, a delay block or counter implemented with several logic gates. The detailed implementations and operations of the Manchester decoder 556_2 are well known by those skilled in the art, and will not be narrated herein. In another embodiment, the Manchester decoder 556_2 may be included in or integrated with the control circuit 558.

Please note that the present invention aims at providing a novel signal transmission system capable of high speed data and low speed command signal transmissions. Those skilled in the art may make modifications and alternations accordingly. For example, in the above embodiment, the Manchester encoding is applied to encode the command signals, allowing the receiver to decode and recover the clock signal and original command signals without the usage of complex CDR circuit. In another embodiment, other similar encoding methods may also be feasible. Further, in the embodiments of the present invention, the termination circuit and the equalizer in the receiver may be selectively disposed or omitted, and/or the output buffer in the transmitter may be selectively disposed or omitted according to system requirements. In addition, in the above embodiment, the command signals and the clock signal are combined to be transmitted through the same channel. In another embodiment, if there are multiple channels coupled between the transmitter and the receiver, the command signals and the clock signal may be transmitted through different channels by efficiently utilizing the channels.

Figure 7:
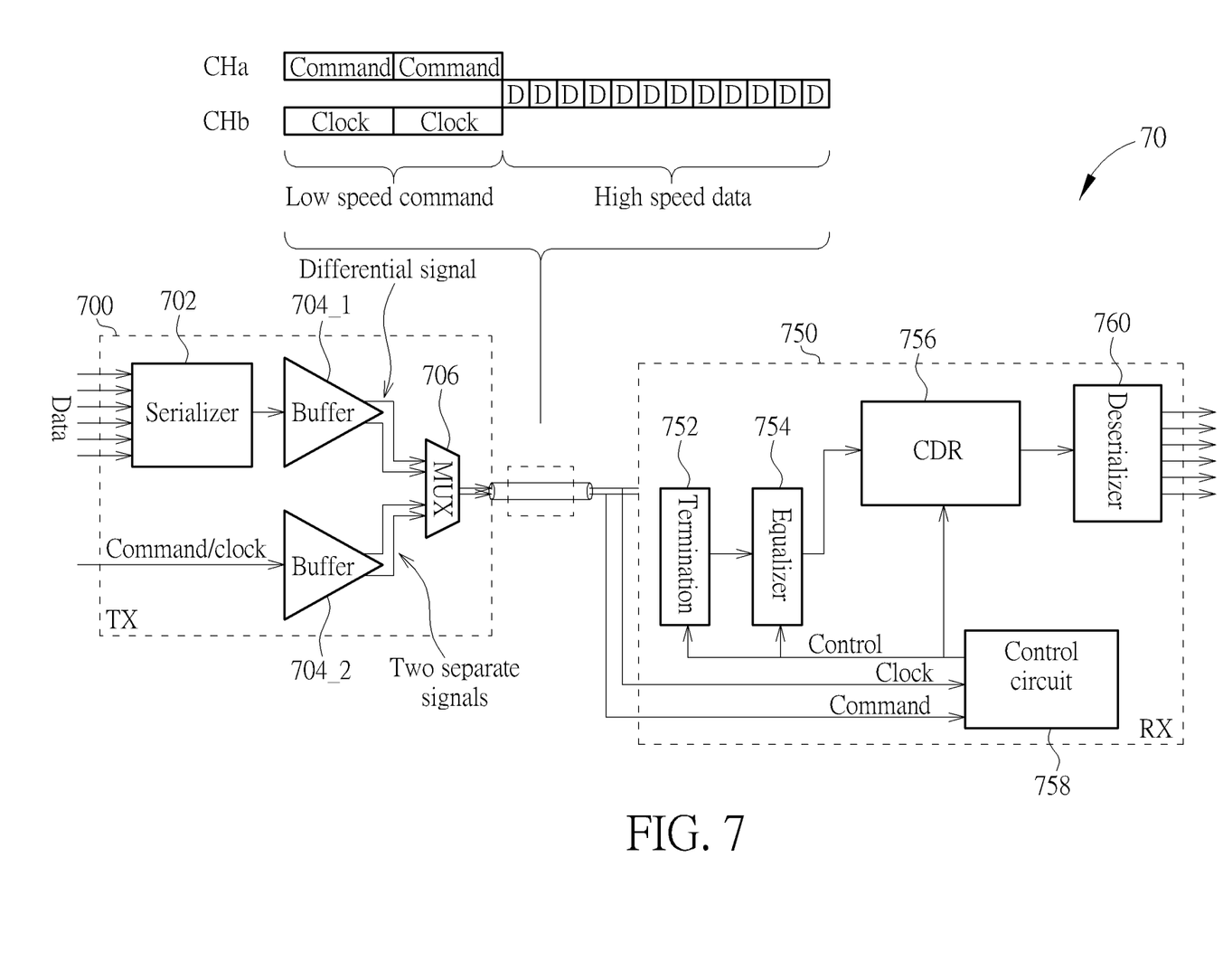
FIG. 7 is a schematic diagram of another signal transmission system according to an embodiment of the present invention.

Please refer to FIG. 7, which is a schematic diagram of another signal transmission system 70 according to an embodiment of the present invention. As shown in FIG. 7, the signal transmission system 70 includes a transmitter 700 and a receiver 750. The transmitter 700 includes a serializer 702 and a MUX 706, which operate similarly as the serializer 402 and the MUX 406, respectively, as shown in FIG. 4, and thus will not be detailed herein. The receiver 750 includes a termination circuit 752, an equalizer 754, a CDR circuit 756, a control circuit 758 and a deserializer 760, which operate similarly as the termination circuit 452, the equalizer 454, the high frequency CDR circuit 456_1, the control circuit 458 and the deserializer 460, respectively, as shown in FIG. 4, and thus will not be detailed herein.

In this embodiment, the channel between the transmitter 700 and the receiver 750 is a differential channel, which is configured to transmit a series of high speed differential data signals. Before the differential data signals are transmitted, the channel is configured to transmit a series of low speed command signals and the corresponding clock signal. The differential channel includes two sub-channels CHa and CHb, one of which is configured to transmit the command signals, and the other is configured to transmit the clock signal while the command signals are transmitted. In this embodiment, the sub-channel CHa is used to transmit the command signals and the sub-channel CHb is used to transmit the clock signal.

When the receiver 750 receives the low speed command signals, the command signals may be directed received by the control circuit 758 since the termination circuit 752, the equalizer 754 and the CDR circuit 756 have not been set up. The control circuit 758 may initialize these circuit blocks based on the received command signals and the corresponding clock signal. Subsequently, these circuit blocks will be ready to receive and process the high speed data signals after initialization.

Therefore, the differential channel between the transmitter 700 and the receiver 750 may be used to transmit differential data signals during a data transmission period, and used to transmit the command signals and the clock signal, respectively, during a command transmission period before the data transmission period. In order to realize the transmission scheme, the transmitter 700 and the receiver 750 may be implemented accordingly.

As shown in FIG. 7, the transmitter 700 may further include two output buffers 704_1 and 704_2 coupled to the MUX 706. In detail, the output buffer 704_1 is coupled between the serializer 702 and the MUX 706, for outputting the series of data signals to the MUX 706 and then to the differential channel. There are two connection lines coupled between the output buffer 704_1 and the MUX 706, and the connection lines are used to forward the differential data signals. The output buffer 704_2 is coupled to another input terminal of the MUX 706, for outputting the series of command signals and the clock signal to the MUX 706 and then to the differential channel. There are two connection lines coupled between the output buffer 704_2 and the MUX 706, and the connection lines are used to forward two separate signals (i.e., the command signal and the clock signal) respectively. Therefore, the MUX 706 may selectively forward the command/clock signal or the data signals to the channel. More specifically, during the command transmission period, the MUX 706 may forward the command signals and the clock signal to the sub-channels CHa and CHb, respectively; and during the data transmission period after the command transmission period, the MUX 706 may forward the differential data signals to the sub-channels CHa and CHb.

The circuit structure of the receiver 750 is similar to the circuit structure of the receiver 550 shown in FIG. 5, except that there is no Manchester decoder in the receiver 750. Therefore, the control circuit 758 of the receiver 750 directly receives the command signals and the clock signal from the transmitter 700 through the differential channel. More specifically, the receiver 750 may receive the command signals through the sub-channel CHa and receive the clock signal through the sub-channel CHb.

Figure 8:
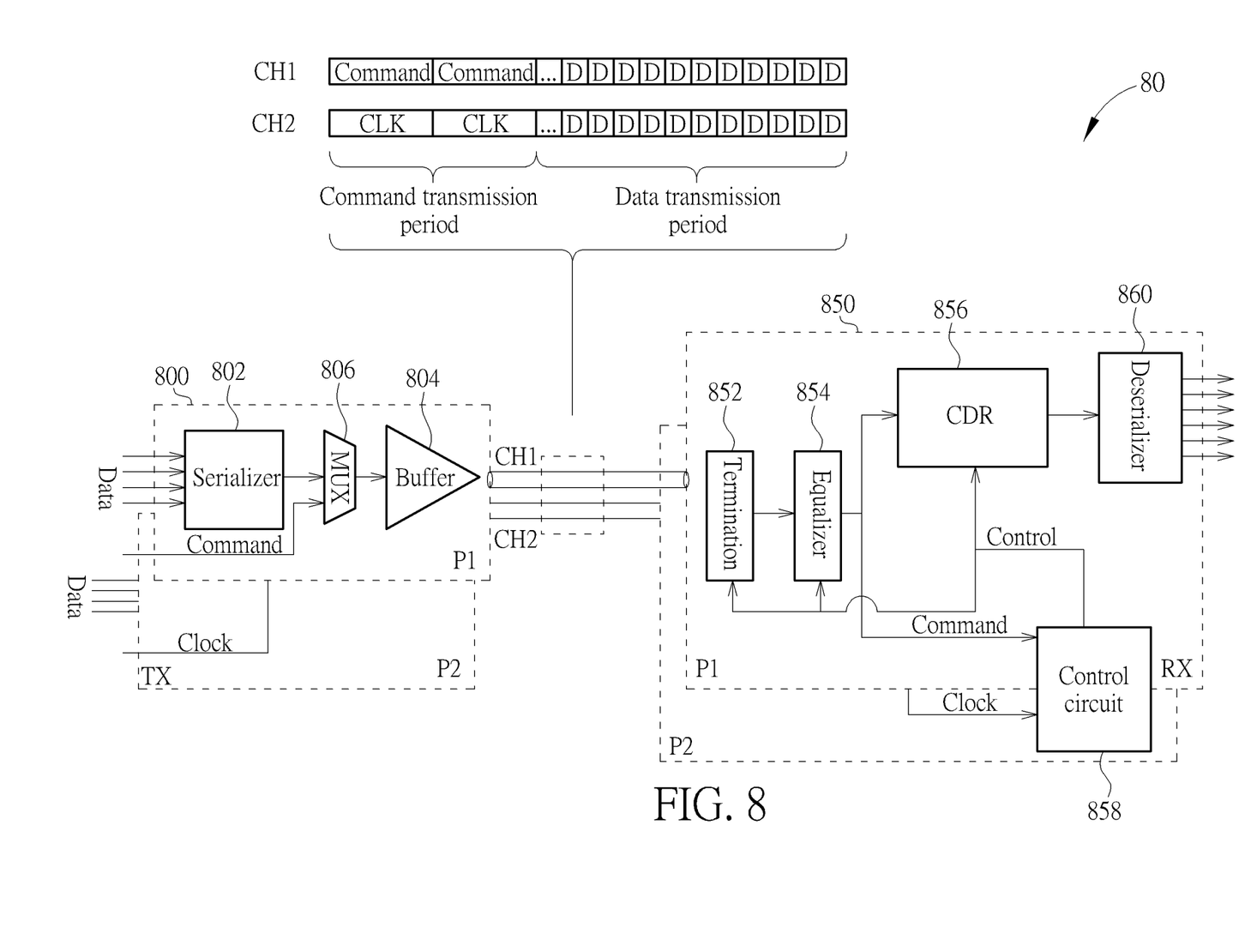
FIG. 8 is a schematic diagram of a further signal transmission system according to an embodiment of the present invention.

Please refer to FIG. 8, which is a schematic diagram of a further signal transmission system 80 according to an embodiment of the present invention. As shown in FIG. 8, the signal transmission system 80 includes two pairs P1 and P2 of transmitters and receivers. Each transmitter includes a serializer 802, an output buffer 804 and a MUX 806, which operate similarly as the serializer 402, the output buffer 404 and the MUX 406, respectively, as shown in FIG. 4, and thus will not be detailed herein. Each receiver includes a termination circuit 852, an equalizer 854, a CDR circuit 856, a control circuit 858 and a deserializer 860, which operate similarly as the termination circuit 452, the equalizer 454, the high frequency CDR circuit 456_1, the control circuit 458 and the deserializer 460, respectively, as shown in FIG. 4, and thus will not be detailed herein. In another embodiment, the MUX 806 may be included in or integrated with the serializer 802.

In this embodiment, the transmitter and receiver in the pair P1 are coupled to each other through a channel CH1, and the transmitter and receiver in the pair P2 are coupled to each other through a channel CH2. Therefore, if the channel CH1 is configured to transmit the command signals, the channel CH2 may be configured to transmit the corresponding clock signal when the command signals are transmitted.

In detail, during the command transmission period, the channel CH1 may forward the command signals and the channel CH2 may forward the clock signal. During the data transmission period after the command transmission period, both channels CH1 and CH2 may forward the data signals. Therefore, at the transmitter side, the output buffer 804 and the MUX 806 in the transmitter of the pair P1 are configured to output a series of command signals followed by a series of data signals, and the output buffer 804 and the MUX 806 in the transmitter of the pair P2 are configured to output the clock signal followed by another series of data signals. At the receiver side, the receivers of the pair P1 and P2 may share the same control circuit 858, which receives the command signals from the channel CH1 and the clock signal from the channel CH2 and thereby initializes or sets up the termination circuit 852, the equalizer 854 and the CDR circuit 856 in the receiver of each pair P1 and P2.

The embodiments of the present invention are widely applicable to transmissions between different ICs. The channel may be any possible inter-chip interface capable of high speed data transmissions, such as the mobile industry processor interface (MIPI) or inter-integrated circuit (I2C) interface.

To sum up, the present invention may provide a signal transmission system capable of high speed data and low speed command signal transmissions. The low speed command signals may be transmitted prior to the high speed data signals through the same channel. Based on the command signals, the circuit blocks in the receiver may be set up and ready to receive the data signals. The command signals should be successfully received with an appropriate clock signal, and thus the receiver includes a high frequency CDR circuit for processing the high speed data signals and also includes a low frequency CDR circuit or decoder for processing the low speed command signals. In an embodiment, the clock information may be embedded in the command signals through Manchester-like encoding, and thus the decoder may extract the clock information from the received command signals. Alternatively, the clock signal may be transmitted through another available channel when the command signals are transmitted. For example, if there is a differential channel disposed between the transmitter and the receiver, one sub-channel of the differential channel may be configured to transmit the command signals, and another sub-channel of the differential channel may be configured to transmit the clock signal. In a further embodiment, two transceiver pairs may be configured to transmit/receive the command signals and the clock signal, respectively. Therefore, according to the embodiments of the present invention, the command signals (together with the corresponding clock signal) may be transmitted through a currently available channel without the usage of additional clock pin, which leads to reduction of circuit areas and costs.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A receiver configured to receive a series of command signals and a series of data signals, the receiver comprising:
   a first clock and data recovery (CDR) circuit, configured to process the series of command signals to generate a clock signal;
   a control circuit, coupled to the first CDR circuit, configured to generate a control signal according to the series of command signals and the clock signal received from the first CDR circuit; and
   a second CDR circuit, coupled to the control circuit, configured to process the series of data signals according to the control signal received from the control circuit;
   wherein a data rate of the series of data signals is greater than a signal rate of the series of command signals.

2. The receiver of claim 1, wherein the second CDR circuit is initialized according to the series of command signals.

3. The receiver of claim 1, wherein the receiver is configured to receive the series of command signals and the series of data signals through a same channel.

4. The receiver of claim 1, wherein the receiver is configured to receive the series of command signals prior to receiving the series of data signals.

5. The receiver of claim 1, wherein the first CDR circuit comprises a decoder, which is configured to decode the series of command signals according to a Manchester-like encoding method.

6. The receiver of claim 1, further comprising:
   a termination circuit; and
   an equalizer, coupled to the termination circuit, the first CDR circuit and the second CDR circuit;
   wherein the control circuit is configured to control the termination circuit, the equalizer and the second CDR circuit according to the series of command signals.

7. A receiver configured to be coupled to a transmitter through a plurality of channels and configured to receive a series of command signals and a series of data signals from the transmitter, the receiver comprising:
   a control circuit, configured to receive the series of command signals through a first channel among the plurality of channels and receive a clock signal through a second channel among the plurality of channels, and generate a first control signal according to the series of command signals and the clock signal; and
   a first clock and data recovery (CDR) circuit, coupled to the control circuit, configured to process the series of data signals according to the first control signal received from the control circuit.

8. The receiver of claim 7, wherein the first CDR circuit is initialized according to the series of command signals.

9. The receiver of claim 7, wherein a data rate of the series of data signals is greater than a signal rate of the series of command signals.

10. The receiver of claim 7, wherein the receiver is configured to receive the series of command signals prior to receiving the series of data signals.

11. The receiver of claim 7, wherein the series of data signals are differential signals transmitted through a differential channel consisting of the first channel and the second channel.

12. The receiver of claim 7, further comprising:
   a first termination circuit, coupled between the first channel and the first CDR circuit;
   a second CDR circuit, coupled to the control circuit, configured to process another series of data signals according to a second control signal received from the control circuit; and
   a second termination circuit, coupled between the second channel and the second CDR circuit.

* * * * *